United States Patent
Jao et al.

(10) Patent No.: US 7,502,183 B2
(45) Date of Patent: Mar. 10, 2009

(54) LENS MODULE AND CAMERA MODULE USING THE SAME

(75) Inventors: Ching-Lung Jao, Miao-Li Hsien (TW); Yu-Chieh Cheng, Miao-Li Hsien (TW)

(73) Assignee: Altus Technology Inc., Chu-Nan, Miao-Li Hsien (TW)

( * ) Notice: Subject to any disclaimer, the term of this patent is extended or adjusted under 35 U.S.C. 154(b) by 159 days.

(21) Appl. No.: 11/618,002

(22) Filed: Dec. 29, 2006

(65) Prior Publication Data

US 2008/0074763 A1    Mar. 27, 2008

(30) Foreign Application Priority Data

Sep. 22, 2006    (CN)    ............ 2006 1 0062725

(51) Int. Cl.
*G02B 7/02* (2006.01)
*G02B 13/16* (2006.01)

(52) U.S. Cl. .............. 359/819; 359/823; 348/335; 348/340; 396/133; 396/144; 250/208.1

(58) Field of Classification Search ............. 359/813, 359/819–823, 825, 826, 811, 830, 695, 698–702, 359/679, 689, 683, 688, 740; 348/335, 340, 348/373, 360, E5.027; 396/72, 73, 460, 529, 396/84, 349, 55, 510, 133, 144; 353/100, 353/101, 43, 72, 69, 119; 250/208.1, 216
See application file for complete search history.

(56) References Cited

U.S. PATENT DOCUMENTS

| 4,258,982 | A | * | 3/1981 | Skinner et al. | 359/819 |
|---|---|---|---|---|---|
| 5,249,082 | A | * | 9/1993 | Newman | 359/813 |
| 5,400,072 | A | * | 3/1995 | Izumi et al. | 348/335 |
| 5,673,083 | A | * | 9/1997 | Izumi et al. | 348/340 |
| 5,751,500 | A | * | 5/1998 | Bedzyk | 359/740 |
| 6,122,114 | A | * | 9/2000 | Sudo et al. | 359/819 |
| 7,274,120 | B2 | * | 9/2007 | Manabe | 310/12 |

* cited by examiner

Primary Examiner—Loha Ben
(74) Attorney, Agent, or Firm—Jeffrey T. Knapp

(57) ABSTRACT

A camera module (100) includes a lens module (10) and an image sensor (20), wherein the lens module includes a barrel (12), a plurality of lenses (14) and at least one spacer between each two neighboring lenses. The barrel includes an inner wall (122), the lenses and the spacer both are received in the barrel; the image sensor is located on an imaging plane of the plurality of lenses. At least one through slot (18) is defined in at least one item selected from the group consisting of lenses, spacer, and between the lenses and spacer. At least one groove (124) is defined between the inner wall of the barrel and the group consisting of the lenses, spacer and the image sensor. The at least one through slot communicates with at least one groove.

20 Claims, 5 Drawing Sheets

LENS MODULE AND CAMERA MODULE USING THE SAME

CROSS-REFERENCE TO RELATED APPLICATION

This application is related to a co-pending U.S. patent application Ser. No. 11/694,550, entitled "LENS MODULE AND CAMERA MODULE USING THE SAME", by Tien-pao Chen. Such application has the same assignee as the present application and is concurrently filed herewith. The disclosure of the above-identified application is incorporated herein by reference.

BACKGROUND OF THE INVENTION

1. Field of the Invention

The present invention generally relates to camera modules and especially, to a ventilated lens module and a camera module using the same.

2. Description of Related Art

Nowadays, digital camera modules are in widespread use. Portable electronic devices such as mobile phones and personal digital assistants (PDAs) are becoming increasingly multifunctional, and digital camera modules are now widely available as a special feature for portable electronic devices, consequently the integration of digital camera modules and portable electronic devices has become an important part of mobile multimedia technology.

A typical camera module includes a barrel and a plurality of lenses, the lenses are usually glued and received in the barrel, so that an airtight space is formed between neighboring lenses in the barrel. In high humidity conditions moisture can permeate into the barrel due to the absorption of water by the glue. This moisture may become trapped in the lens structure and may condense on lens surfaces causing images formed by the lens structure to be blurred. As a result, the quality of the image formed by the camera module may be affected.

Accordingly, what is needed is a ventilated lens module and camera module using the same that can prevent moisture condensing on surfaces of lens in the lens module.

SUMMARY

In one aspect thereof, A camera module includes a lens module and an image sensor. The lens module includes a barrel, a plurality of lenses and at least one spacer between the neighboring lenses, wherein the barrel includes an inner wall, the lenses and the spacer are received in the barrel. The image sensor is located on an imaging plane of the plurality of lenses. The at least one through slot is defined on at least one item selected from the group consisting of lenses, spacer, and between the lenses and the spacer. The at least one groove is defined between the inner wall of the barrel and the group consisting of the lenses, spacer and the image sensor. The through slot communicates with the groove.

Other advantages and novel features will become more apparent from the following detailed description when taken in conjunction with the accompanying drawings.

BRIEF DESCRIPTION OF THE DRAWINGS

Many aspects of the lens module and the camera module using the same can be better understood with reference to the following drawings. The components in the drawings are not necessarily drawn to scale, the emphasis instead being placed upon clearly illustrating the principles of the present camera module and the lens module thereof. Moreover, in the drawings, like reference numerals designate corresponding parts throughout the several views.

DETAILED DESCRIPTION OF THE INVENTION

Figure 1:
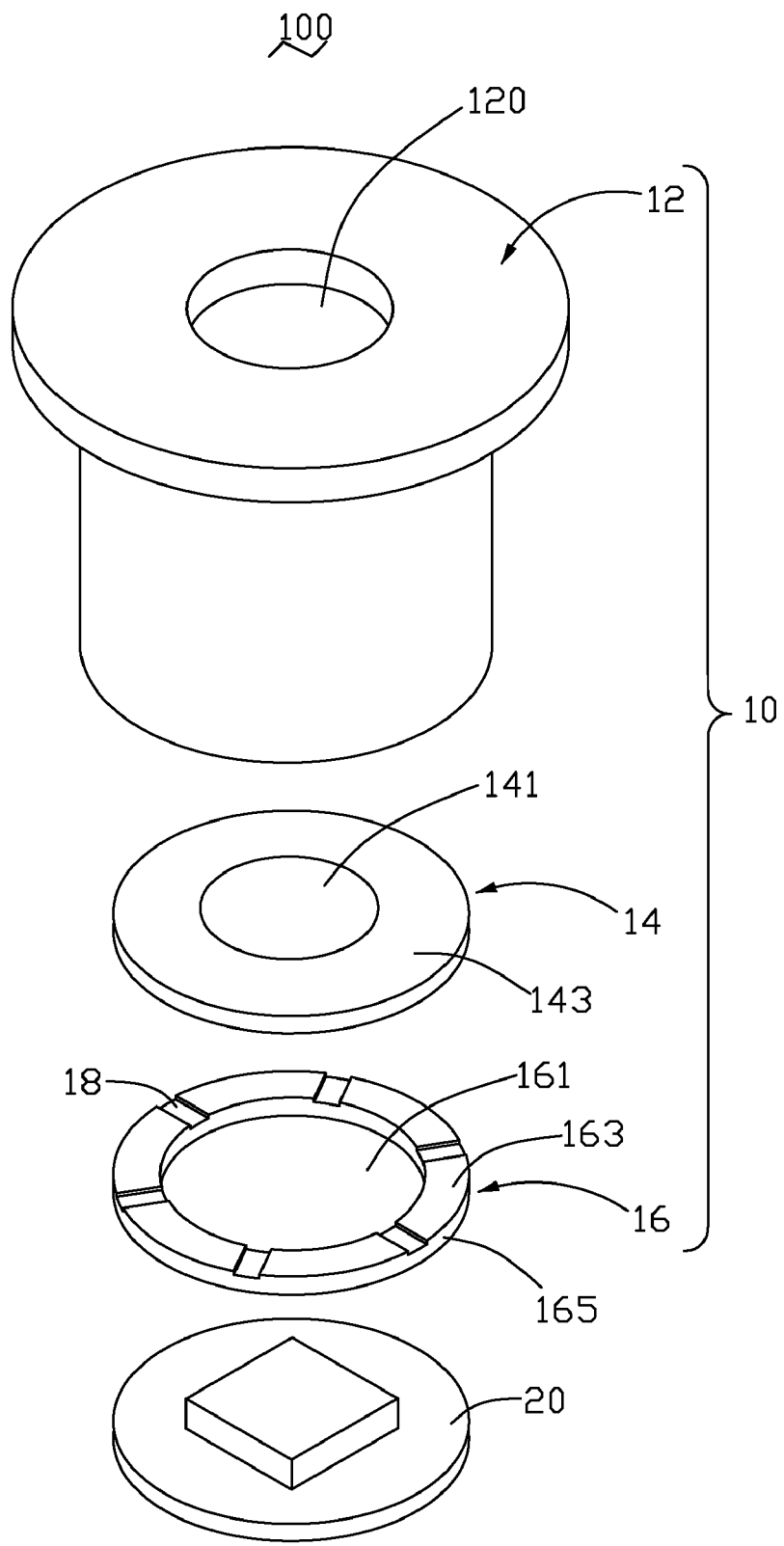
FIG. 1 is a partial exploded, isometric view of a camera module, in accordance with a first embodiment.
Figure 2:
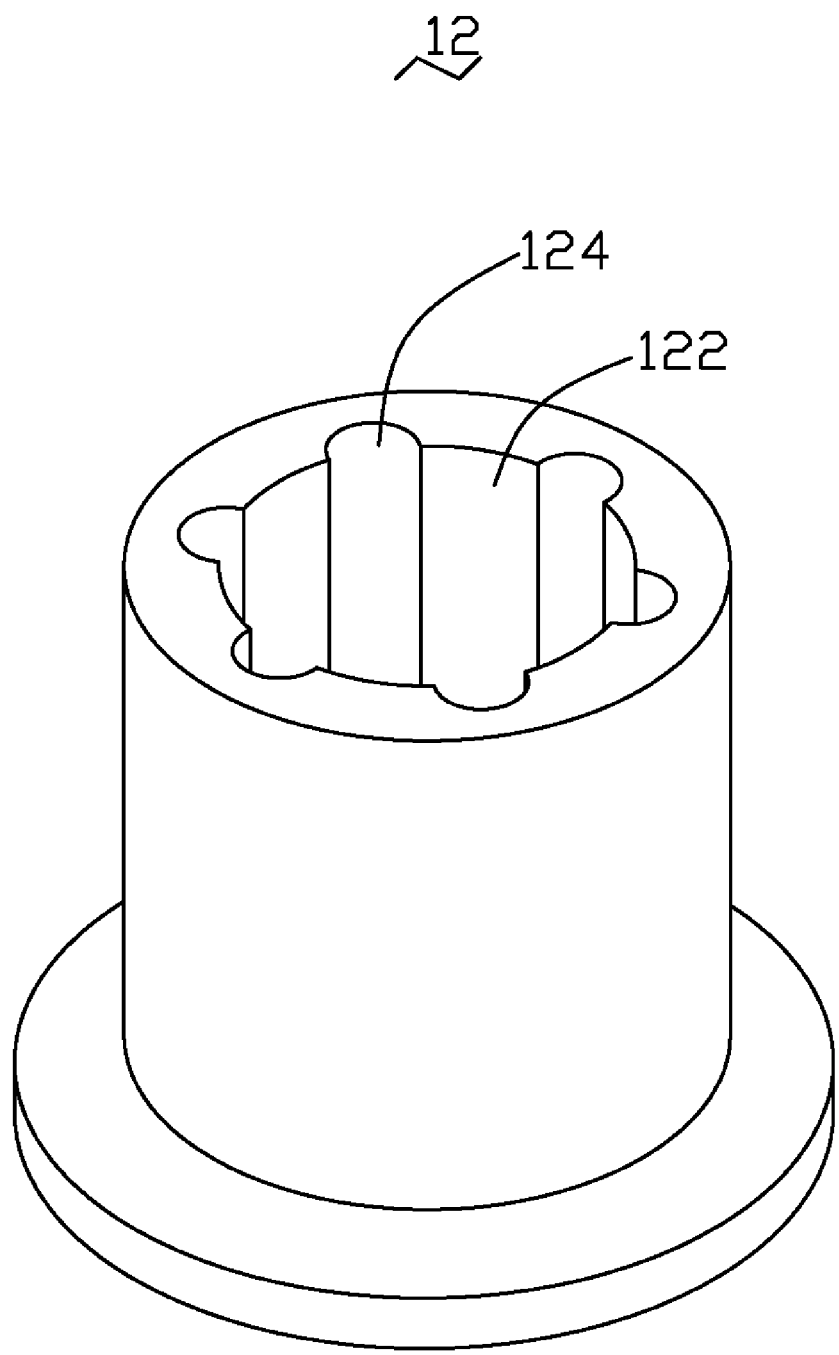
FIG. 2 is an isometric view of a barrel of the camera module shown in FIG. 1.
Figure 3:
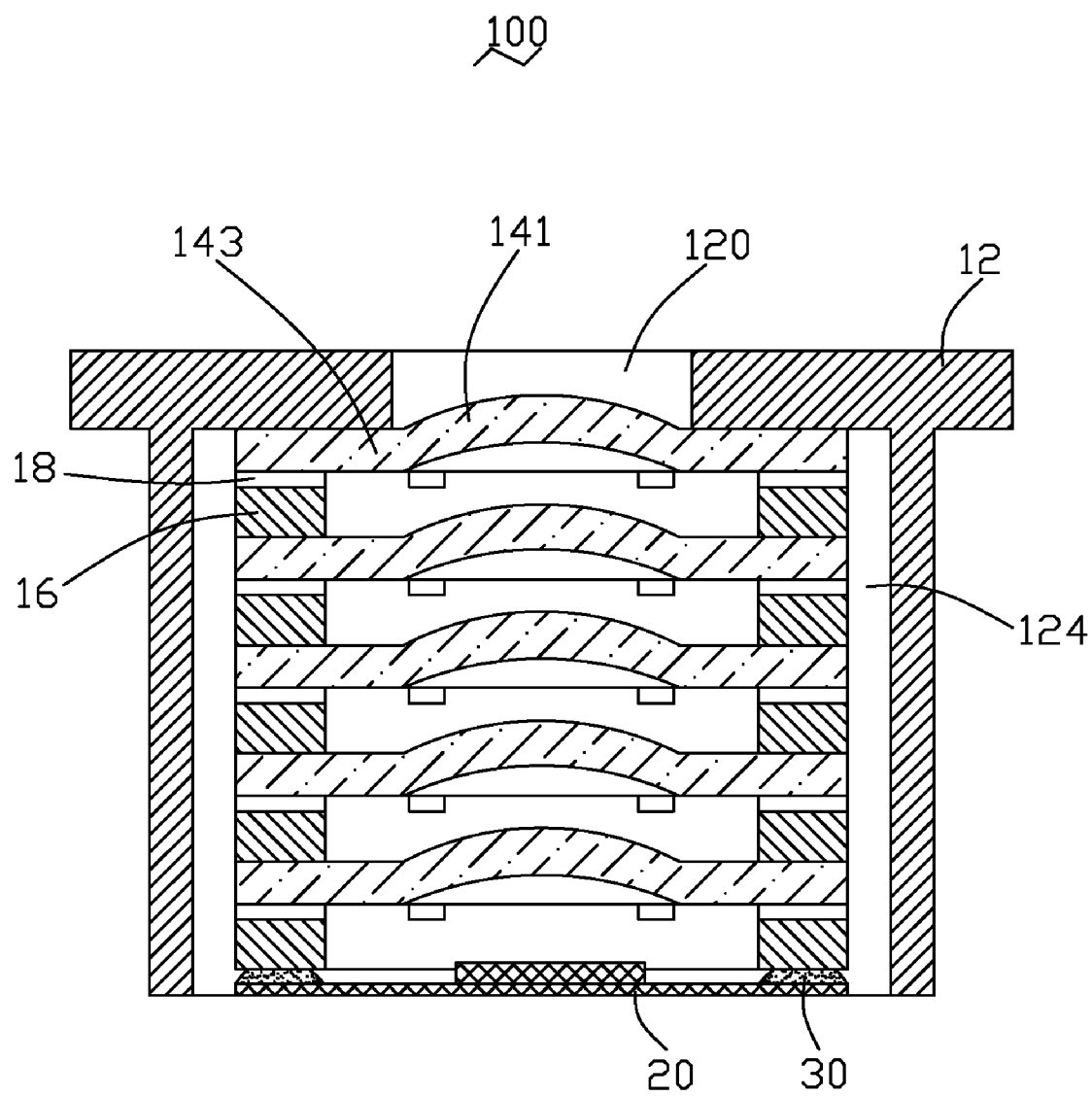
FIG. 3 is an assembled cross-sectional view of the camera module shown in FIG. 1.

Referring to FIGS. 1-3, a camera module 100 of a first embodiment includes a lens module 10 and an image sensor 20. The lens module 10 includes a barrel 12, a plurality of lenses 14 and a plurality of spacing rings 16 provided between neighboring lenses 14. The spacing rings 16 are used for limiting the distance between the neighboring lenses 14 and improving the optical performance. The lenses 14 and the spacing rings 16 are received in the barrel 12. The image sensor 20 is located on an imaging plane of the lens module 10.

The barrel 12 is a hollow cylinder with an open end and a half open end. The barrel 12 includes a light-through hole 120 and an inner wall 122. The light-through hole 120 is defined in the center of the half open end of the barrel 12. Six arc grooves 124 are symmetrically defined on the inner wall 122 axially. Each of the grooves 124 has two ends respectively near each of the two ends of the barrel 12.

The lenses 14 are spherical or aspherical lenses used to focus the light onto the image sensor 20. Each of the lenses 14 includes a base 143 and an optical portion 141 in a central area thereof.

Each of the spacing rings 16 has an external diameter essentially identical to the lenses 14. Each of the spacing rings 16 includes a light-through hole 161, a top/bottom surface 163, and a sidewall 165. The light-through hole 161 is defined in a central area of each of the spacing rings 16. The size of the light-through hole 161 is larger than the size of the optical portion 141, so that the spacing rings 16 do not affect the optical performance of the lenses 14. Preferably the light-through hole 161 should have the same shape as the optical portion 141. Six slots 18 are symmetrically defined through the top surface 163 of each of the six spacing rings 16. Each of the slots 18 faces towards its corresponding groove 124 on the inner wall 122 of the barrel 12.

The spacing rings 16 are respectively positioned between neighboring lenses 14. The spacing rings 16 and the lenses 14 are received in the barrel 12 and mated to the inner wall 122 of the barrel 12. Each of the slots 18 communicates with its corresponding groove 124. The moisture existing between the neighboring lenses 14 can thus escape through the slots 18 and the grooves 124.

It should be understood that the quantity of the spacing rings 16 should correspond to that of the lenses 14. If the quantity of the lenses 14 is only two, then there should be one spacing ring 16, if there are four lenses 14 then there should be three spacing rings 16 and so on. Alternatively, the six slots 18 on each of the spacing rings 16 can instead be one or more blowholes (not shown) on the sidewall of each of the spacing rings 16, each of the blowholes being connected to a corresponding groove 124. The slots 18 can also be defined on the top surface or bottom surface of each of the lenses 14, and communicates with the groove 124. Besides, the six slots 18 can also instead be one or more pipes (not shown) provided between each of the lenses 14 and the neighboring spacing ring 16.

The image sensor 20 is located near the open end of the barrel 12 and on an imaging plane of the lens module 10. A periphery of the image sensor 20 is fixed to the inner wall 122 of the barrel 12 by some glue 30.

Figure 4:
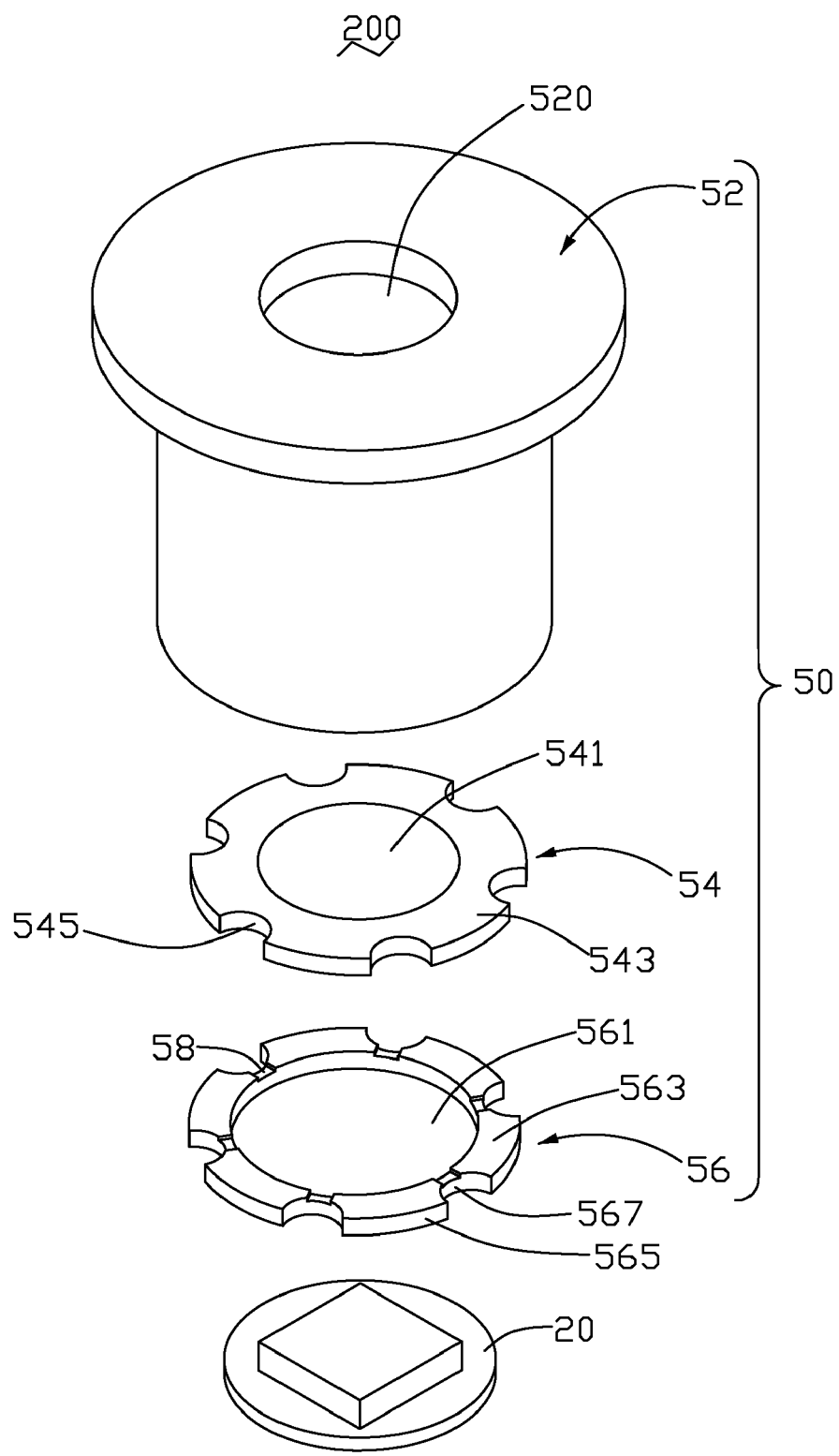
FIG. 4 is a partial exploded, isometric view of the camera module, in accordance with a second embodiment.
Figure 5:
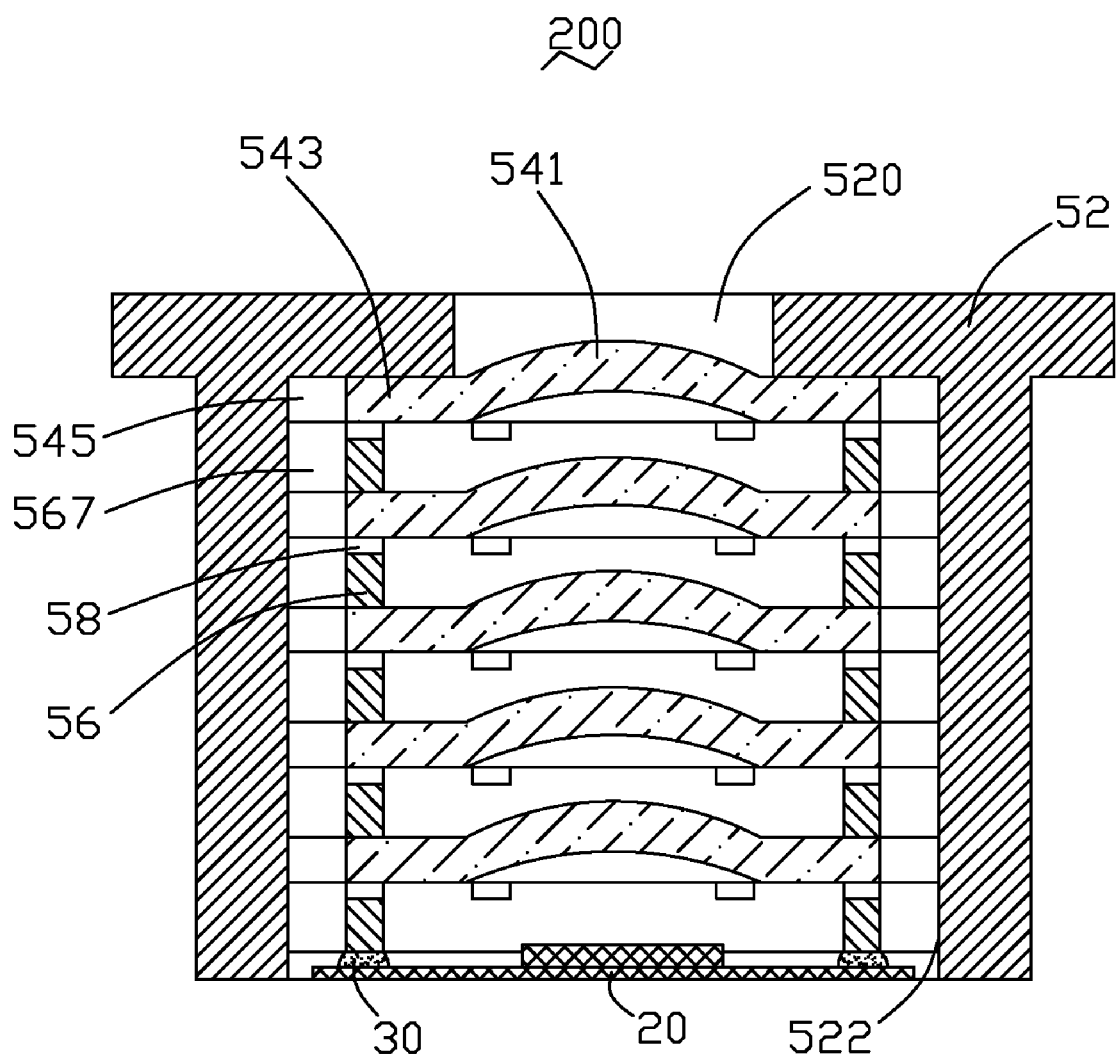
FIG. 5 is an assembled cross-sectional view of the camera module shown in FIG. 4.

Further referring to FIG. 4 and FIG. 5, a camera module 200 of a second embodiment includes a lens module 50 and an image sensor 20. The lens module 50 includes a barrel 52, a plurality of lenses 54 and a plurality of spacing rings 56 provided between neighboring lenses 54.

The barrel 52 is a hollow cylinder with an open end and an half open end. The barrel 52 includes a light-through hole 520 and an inner wall 522. The light-through hole 520 is defined in the center of the half open end of the barrel 12. Differing from the first embodiment, there is no groove defined on the inner wall 522 in the second embodiment.

The lenses 54 are spherical or aspherical lenses used to focus the light onto the image sensor 20. Each of the lenses 54 includes a base 543 and an optical portion 541 in a central area thereof. Six indentations 545 are symmetrically defined on a periphery of each of the lenses 54. The first indentations 545 are arc-like in shape.

Each of the spacing rings 56 has an external diameter essentially equal to the lenses 54. Each of the spacing rings 56 includes a light-through hole 561, a top/bottom surface 563, and a sidewall 565. Six second indentations 567 are defined in the sidewall 565 of each of the spacing rings 56. Each of the second indentations 567 faces towards and aligns with its corresponding first indentation 545 on the periphery of the lenses 54. Six air slots 58 are radially defined on the top/bottom surface 563. Each of the air slots 58 faces towards and communicates with its corresponding second indentation 567.

The spacing rings 56 are respectively positioned between neighboring lenses 54. The spacing rings 56 and the lenses 54 are received in the barrel 52 and mated to the inner wall 522 of the barrel 12. The first indentations 545 communicate respectively with the corresponding second indentation 567 thereof, and the first indentations 545 and the second indentations 567 communicate with the air slots 58. The moisture existing between the neighboring lenses 54 can thus escape through the air slots 58, the first indentations 545 and the second indentations 567.

Alternatively, the six air slots 58 on each of the spacing rings 56 can instead be one or more blowholes (not labeled) on the sidewall of each of the spacing rings 56, each of the blowholes being connected to a corresponding first indentation 545 and second indentation 567. The six air slots 58 can also be defined on the top surface or bottom surface of each of the lenses 54, and respectively communicate with the corresponding first indentation 545. Besides, the air slots 58 can also instead be one or more pipes provided between each of the lenses 54 and the neighboring spacing rings 56.

The image sensor 20 is located at the open end of the barrel 52 and on an imaging plane of the lens module 50. The image sensor 20 is fixed to the inner wall 522 of the barrel 52. The second indentation 567 is unshielded by the image sensor 20. The moisture existing between the neighboring lenses 54 can thus escape through the air slot 58, the first indentations 545 and the second indentations 567. The image sensor 20 can also adhere to a bottom surface 563 of a spacing ring 56 adjacent to the open end of the barrel 52.

It should be understood that the spacing rings 16 or the spacing rings 56 can instead be another spacer such as a plurality of blocks located between neighboring lenses 14 or neighboring lenses 54. A space between neighboring blocks communicates with at least one item selected from the group consisting of the grooves 124 on the barrel 12, and the first indentations 545 and the second indentations 567.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera module comprising:
a lens module including a barrel, a plurality of lenses and at least one spacer between each two neighboring lenses, wherein the barrel includes an inner wall, the lenses and the spacer are received in the barrel and surrounded by the inner wall; and
an image sensor located on an imaging plane of the plurality of lenses; wherein at least one through slot is defined in at least one item selected from the group consisting of the lenses, the spacer, and between the lenses and the spacer; at least one groove is defined between the inner wall of the barrel and the group consisting of the lenses, spacer and the image sensor and communicates with outside of the barrel; the at least one through slot communicates with the at least one groove.

2. The camera module as claimed in claim 1, wherein each of the lenses is a spherical or aspherical optical lens including a base and an optical portion in a central area of the base.

3. The camera module as claimed in claim 2, wherein the spacer comprises a spacing ring with a light-through hole, a surface, and a sidewall, and the light-through hole is defined in a central area of the spacing ring.

4. The camera module as claimed in claim 3, wherein at least one first indentation is defined on a periphery of each of the lenses, at least one second indentation is defined on the sidewall of the spacing ring, each of the at least one second indentation aligns with a corresponding first indentation on the periphery of each of the lenses.

5. The camera module as claimed in claim 4, wherein the at least one slot is at least one item selected from the group consisting of one or more blowholes on the sidewall of the spacing ring, pipes between each of the lenses and the neighboring spacing ring and, at least one through slot on a surface of the spacing ring or a surface of the base of the lenses, the slot communicates with the second indentation.

6. The camera module as claimed in claim 5, wherein the image sensor is fixed adjacent to the open end of the barrel, the second indentation is unshielded by the image sensor.

7. The camera module as claimed in claim 3, wherein the at least one slot can be at least one item selected from the group consisting of one or more blowholes on the sidewall of the spacing ring, one or more pipes between each of the lenses and the neighboring spacing ring, and at least one through slot on a surface of the spacing ring or a surface of the base of the lenses.

8. The camera module as claimed in claim 4, wherein the spacer includes a plurality of blocks between neighboring lenses, a space between neighboring blocks communicates with the groove on the barrel.

9. The camera module as claimed in claim 4, wherein the spacer includes a plurality of blocks between neighboring lenses, a space between neighboring blocks communicate with the first indentation and the second indentation.

10. The camera module as claimed in claim 2, wherein the camera module defines a plurality of grooves symmetrically defined on the inner wall axially.

11. A lens module comprising:
a barrel with an inner wall;
a plurality of lenses; and
at least one spacer disposed between two neighboring lenses, the lenses and the spacer being received in the barrel; wherein at least one through slot is defined on at least one item selected from the group consisting of lenses, spacer, and between the lenses and the spacer; at least one groove is defined between the inner wall of the barrel and the group consisting of the lenses and spacer; the at least one through slot communicates with the at least one groove.

12. The lens module as claimed in claim 11, wherein each of the lenses is a spherical or aspherical optical lens including a base and an optical portion in a central area of the base.

13. The lens module as claimed in claim 12, wherein the spacer is a spacing ring with a light-through hole, a surface, and a sidewall, the light-through hole is defined in a central area of the spacing ring.

14. The lens module as claimed in claim 13, wherein at least one first indentation is defined in a periphery of each of the lenses, at least one second indentation is defined in the sidewall of the spacing ring, the at least one second indentation faces towards its corresponding first indentation on the periphery of each of the lenses.

15. The lens module as claimed in claim 14, wherein the spacer includes a plurality of blocks between neighboring lenses, a space between neighboring blocks communicates with the first indentation and the second indentation.

16. The lens module as claimed in claim 13, wherein the at least one slot can be at least one item selected from the group consisting of one or more blowholes on the sidewall of the spacing ring, one or more pipes between each of the lenses and the neighboring spacing ring, and at least one through slot on the surface of the spacing ring or a surface of the base of the lenses.

17. The lens module as claimed in claim 12, wherein the spacer includes a plurality of blocks between neighboring lenses, a space between neighboring blocks communicates with the groove in the barrel.

18. A camera module comprising:
a lens module including a barrel having a chamber and a circumferential wall surrounding the chamber, a plurality of alternately arranged lenses and spacers fitly held within the chamber, a space being formed between any two neighboring lenses and surrounded by a corresponding spacer; and
an image sensor located on an imaging plane of the lenses; wherein
at least one channel is defined between any two neighboring lenses and communicates with the space, and at least one groove is defined between an inner surface of the circumferential wall of the barrel and peripheries of the lenses and the spacers, the at least one groove communicates the at least one slot with outside of the barrel.

19. The camera module as claimed in claim 18, wherein the at least one channel comprises a plurality of slots extending in radial directions of the barrel, and the at least one groove extends along the inner surface of the circumferential wall of the barrel without extending through the circumferential wall in the radial directions of the barrel.

20. The camera module as claimed in claim 19, wherein each of the lenses defines at least one first indentation radially recessed from the periphery thereof, each of the spacers defines at least one second indentation radially recessed from the periphery thereof, the first indentations being aligned with and communicating with the second indentations to form the at least one groove.

* * * * *